UNITED STATES PATENT OFFICE.

CHARLES A. LA MONT, OF TURNER'S, NEW YORK.

DESICCATED EGG.

SPECIFICATION forming part of Letters Patent No. 283,618, dated August 21, 1883.

Application filed February 14, 1882. (No specimens.)

*To all whom it may concern:*

Be it known that I, CHAS. A. LA MONT, a resident of Turner's, county of Orange, and State of New York, have invented certain new and useful Improvements in Desiccating Eggs; and I do hereby declare that the following is a full, clear, and exact description thereof.

My invention relates to the article of commerce known as "desiccated eggs," for which Letters Patent of the United States were granted me November 28, 1865, No. 51,263. While eggs, when dried by my process and concentrated in the form of minute particles admitting of ready resolution by the addition of water to a condition approximating very closely in quality and essential characteristics the pure fresh egg, have furnished a most desirable product as an article of condensed food, it has nevertheless been found that when the eggs are thus reduced to a solid condition by simple desiccation alone the desiccated product in course of time deteriorates by partial decomposition, so as to lose measurably its original sweet, pure quality.

The object of my invention is to preserve the sweetness and delicacy of the prepared egg for a long period of time. The accomplishment of this result has heretofore been sought in the combination of sugar with the egg; and such a compound was covered by Letters Patent No. 184,479, granted to Charles Peck, November 21, 1876; but in practice this compound has proven more unstable than the egg product pure and simple, from the fact that the sugar, which is a vegetable product, is subject, in the presence of moisture, to fermentation, either acid or alcoholic, according to the temperature. After a protracted series of experiments, involving much delay because of the time necessarily involved in ascertaining the result of each experiment, I have discovered that an admixture, as hereinafter described, of chloride of sodium or common salt with the meat or batter of the eggs as it is removed from the shell, and immediately before it is subjected to the process of desiccation, will produce, when the process is completed, a compound which will not only possess all the superior advantages of the fresh desiccated or crystallized egg patented by me as aforesaid, but will remain unchanged and unaltered in a good, sweet, wholesome condition for a great length of time.

My invention consists, therefore, in a composition obtained by admixing chloride of sodium in proper proportion with the viscid mass of egg taken from its shell and desiccating the same in the form of thin flaky particles, which are readily and completely soluble in water.

In carrying out my invention the meat or batter of the eggs is removed from the shells and finely-pulverized salt is added thereto, in the proportion of about one ounce of salt to about twenty dozen of eggs. The mass is then thoroughly agitated to effect a complete dissolution and admixture of the salt throughout the egg, which is then immediately and quickly dried upon revolving disks, as set forth in the Letters Patent granted to me October 10, 1865, No. 50,421, or by such other process as shall convert the semi-liquid egg into hard, fine, dry particles. The compound thus obtained is in a dry finely-comminuted condition, and will readily dissolve in water, milk, or other liquid, and when kept dry will remain unaltered and in its original fresh, pure condition for a long time.

I contemplate the preparation of the albumen and yolk of the eggs, each separately, substantially in the manner as described, and the admixture or combination of salt therewith for the purpose specified, in substantially the same proportion—viz., about four ounces of salt to about one hundred pounds of albumen or yelk.

I do not claim, broadly, the use of salt as a preservative for the eggs. I only claim to have obtained a soluble solidified compound of egg and salt, which, while possessing the characteristics of simple fresh desiccated eggs, will retain said characteristics for a longer time.

Having thus fully described my invention, what I claim as new, and desire to secure by Letters Patent, is—

The within-described comminuted compound of egg-batter and chloride of sodium, produced in hard soluble flakes or particles, substantially as described.

In testimony whereof I have signed my name to this specification in the presence of two subscribing witnesses.

C. A. LA MONT.

Witnesses:
J. F. ACKER, Jr.,
P. ELBERT NOSTRAND.